United States Patent
Li et al.

(10) Patent No.: US 7,486,443 B1
(45) Date of Patent: *Feb. 3, 2009

(54) HIGH EXTINCTION RATIO AND LOW CROSSTALK COMPACT OPTICAL SWITCHES

(75) Inventors: Ming Li, Pleasanton, CA (US); Song Peng, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/224,748

(22) Filed: Aug. 20, 2002

Related U.S. Application Data

(63) Continuation-in-part of application No. 09/794,590, filed on Feb. 26, 2001, now Pat. No. 6,594,082.

(60) Provisional application No. 60/209,733, filed on Jun. 5, 2000, provisional application No. 60/211,347, filed on Jun. 13, 2000, provisional application No. 60/232,168, filed on Sep. 11, 2000.

(51) Int. Cl.
G02B 5/30 (2006.01)
G02B 27/28 (2006.01)

(52) U.S. Cl. .................................. 359/495; 359/497

(58) Field of Classification Search ............... 359/484, 359/495, 618, 290, 291, 627, 497; 385/18, 385/140; 356/451, 461
See application file for complete search history.

(56) References Cited

U.S. PATENT DOCUMENTS

| | | | | |
|---|---|---|---|---|
| 5,768,005 | A * | 6/1998 | Cheng et al. | 359/281 |
| 6,097,451 | A * | 8/2000 | Palmer et al. | 349/14 |
| 6,181,846 | B1 * | 1/2001 | Pan | 385/18 |
| 6,233,054 | B1 * | 5/2001 | Thériault | 356/451 |
| 6,246,518 | B1 * | 6/2001 | Chang et al. | 359/494 |
| 6,404,538 | B1 * | 6/2002 | Chen et al. | 359/323 |
| 6,577,364 | B1 * | 6/2003 | Tillin et al. | 349/119 |
| 6,594,082 | B1 * | 7/2003 | Li et al. | 359/618 |
| 2001/0048556 | A1 * | 12/2001 | Ranalli et al. | 359/497 |
| 2002/0071180 | A1 * | 6/2002 | Ducellier et al. | 359/483 |
| 2003/0059155 | A1 * | 3/2003 | Riza | 385/18 |
| 2003/0161028 | A1 * | 8/2003 | Gosselin et al. | 359/290 |

* cited by examiner

*Primary Examiner*—Joshua L Pritchett
(74) *Attorney, Agent, or Firm*—Patterson & Sheridan, LLP

(57) ABSTRACT

An improved optical switch utilizes one polarization modulator, with the beam components traversing it twice. Because of the twice traverse, the extinction ratio of the switch is doubled without the addition of another polarization modulator, thus avoiding the costs of additional optical components. With no additional components, the switch is more compact than conventional switches with the same extinction ratio. Fewer components also result in more thermal and long-term stability and less crosstalk.

23 Claims, 6 Drawing Sheets

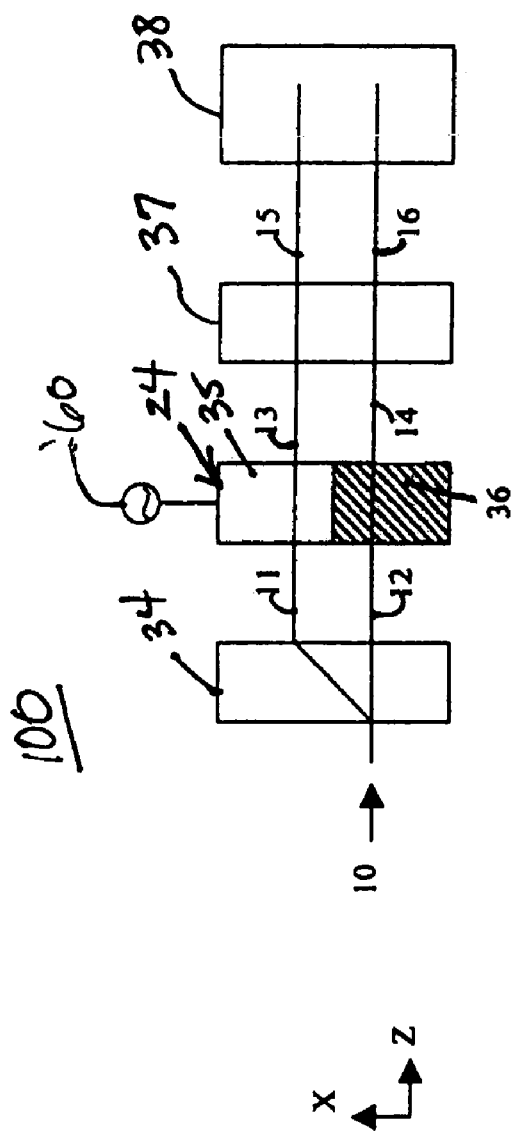
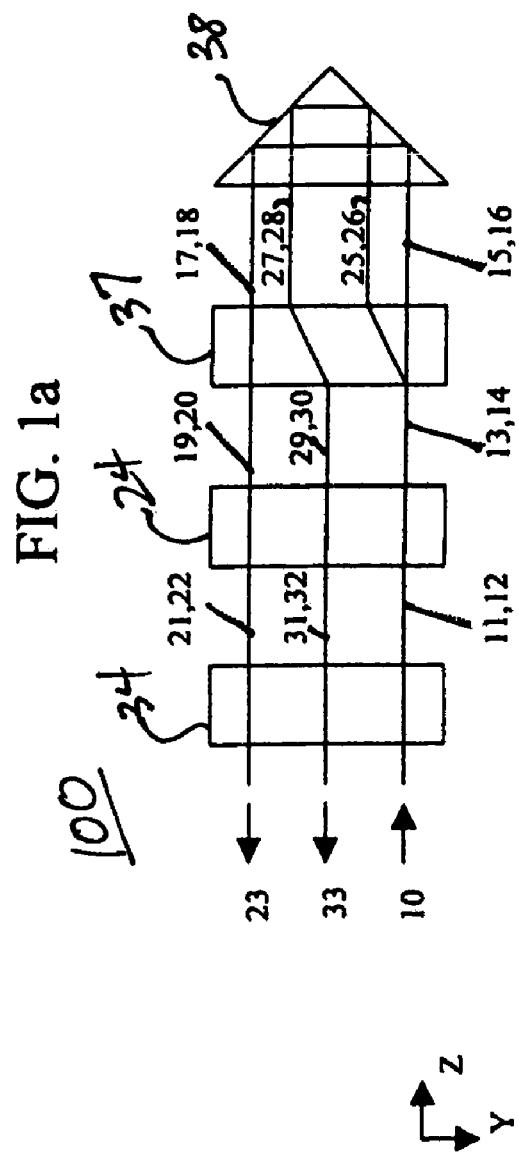
FIG. 1a
FIG. 1b

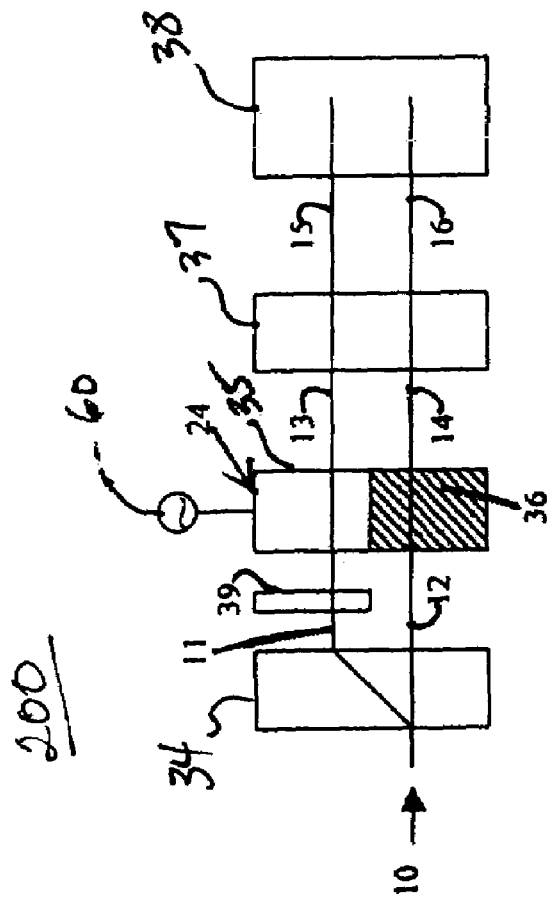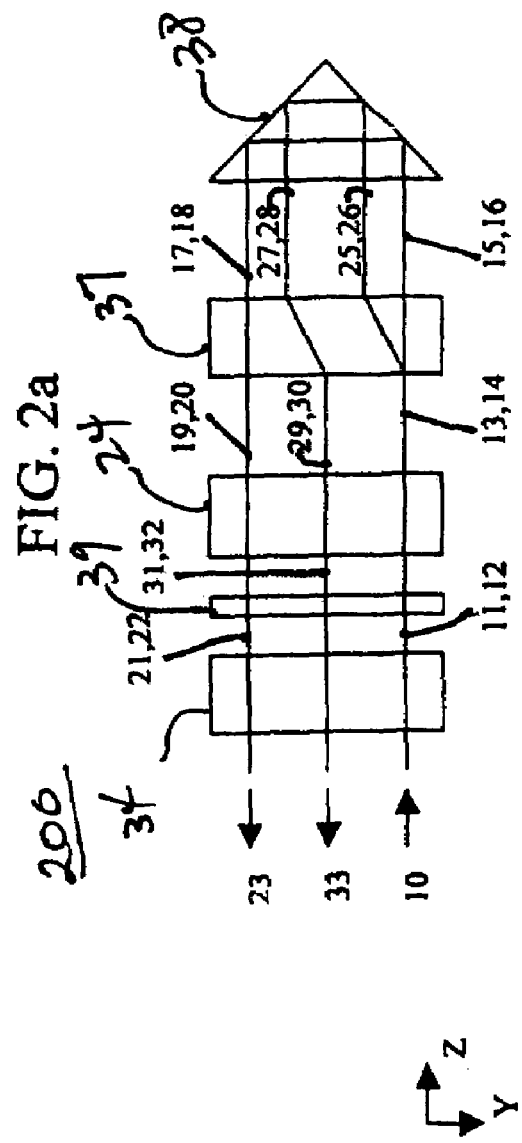
FIG. 2a
FIG. 2b

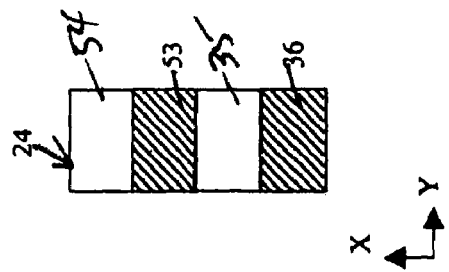
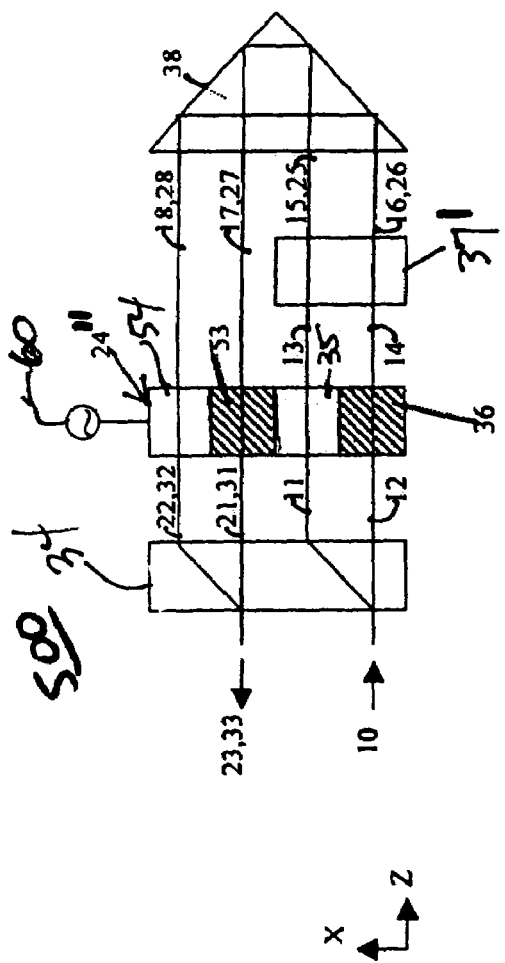
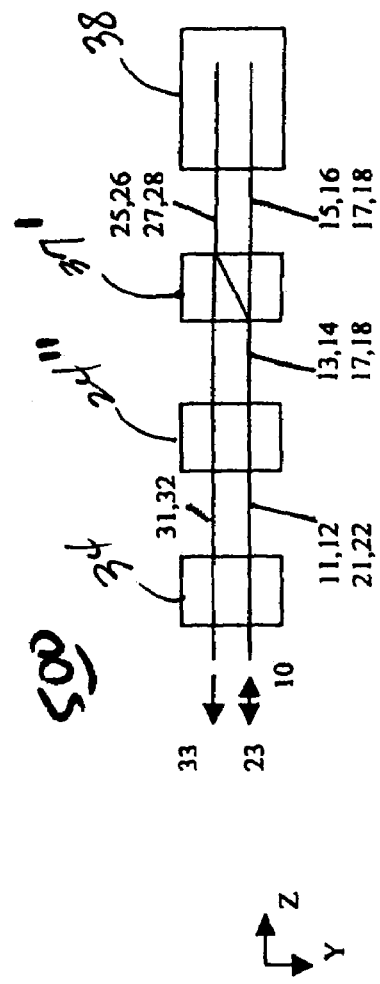
FIG. 5c
FIG. 5a
FIG. 5b

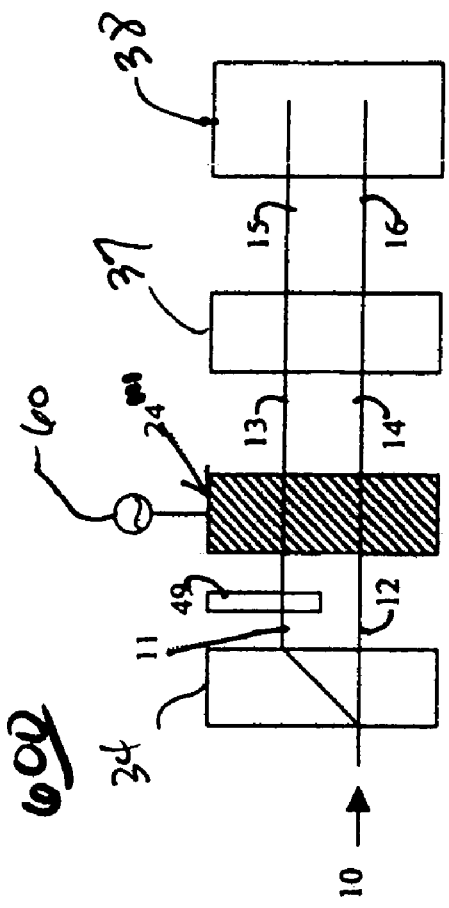
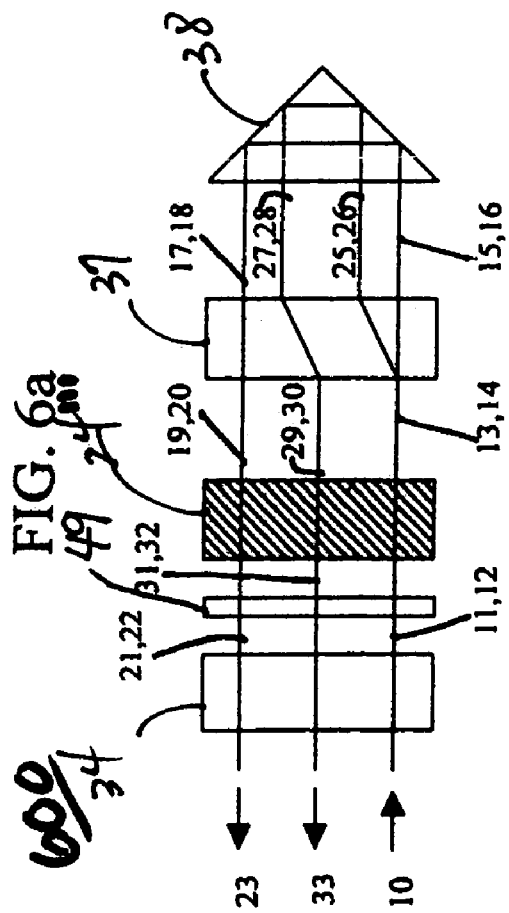
FIG. 6a
FIG. 6b

HIGH EXTINCTION RATIO AND LOW CROSSTALK COMPACT OPTICAL SWITCHES

CROSS-REFERENCE TO RELATED APPLICATIONS

This application claims priority under 35 U.S.C. §119(e) the benefit of U.S. Provisional Patent Application Ser. No. 60/314,354, entitled "High Extinction Ratio Law Cross Talk Commpact Optical Switches," filed on Aug. 22, 2001.

This application is a continuation-in-part of U.S. patent application Ser. No. 09/794,590, filed Feb. 26, 2001, now U.S. Pat. No. 6,594,082, issued Jul. 15, 2003, which claims the benefit of: U.S. Provisional Appl. No. 60/209,733, filed Jun. 5, 2000: U.S. Provisional Appl. No. 60/211,347, filed Jun. 13, 2000; and U.S. Provisional Appl. No. 60/232,168, filed Sep. 11, 2000.

FIELD OF THE INVENTION

The present invention relates to optical switches, and more particularly to the extinction ratio and crosstalk of optical switches.

BACKGROUND OF THE INVENTION

Optical switches that route optical signals between optical fibers in a optical communications networks are well known in the art. An important parameter in defining the performance of an optical switch is its extinction ratio. The extinction ratio is the ratio between the light output at full power and light output when a zero bit is being signaled. It is a measure of the difference in signal levels between a one and a zero state, and is usually quoted in decibels (dB). The higher the extinction ratio, the better the performance of the optical switch.

Many conventional optical switches use a liquid crystal device, such as a polarization modulator to facilitate switching, with the signal traversing the liquid crystal device once. The use of liquid crystal devices in this manner is well known in the art. The extinction ratios for these switches are approximately 20 to 25 dB. To increase the extinction ratio, a second liquid crystal device is typically used, where the signal traverses both liquid crystal devices. However, with more optical components, the cost of manufacturing the switch increases. In addition, the thermal and long-term stability of the switch is compromised, resulting in a greater amount of crosstalk.

Accordingly, there exists a need for an improved optical switch. The improved switch should provide an increase in the extinction ratio of the switch without requiring additional optical components. The present invention addresses such a need.

SUMMARY OF THE INVENTION

An improved optical switch utilizes one polarization modulator, with the beam components traversing it twice. Because of the twice traverse, the extinction ratio of the switch is doubled without the addition of another polarization modulator, thus avoiding the costs of additional optical components. With no additional components, the switch is more compact than conventional switches with the same extinction ratio. Fewer components also result in more thermal and long-term stability and less crosstalk.

BRIEF DESCRIPTION OF THE FIGURES

FIGS. 1a-1b illustrate a first preferred embodiment of an optical switch in accordance with the present invention.

FIGS. 2a and 2b illustrate a second preferred embodiment of the optical switch in accordance with the present invention.

FIGS. 5a-5c illustrate a fifth preferred embodiment of the optical switch in accordance with the present invention.

FIGS. 6a-6b illustrate a sixth preferred embodiment of the optical switch in accordance with the present invention.

DETAILED DESCRIPTION

Figure 3:
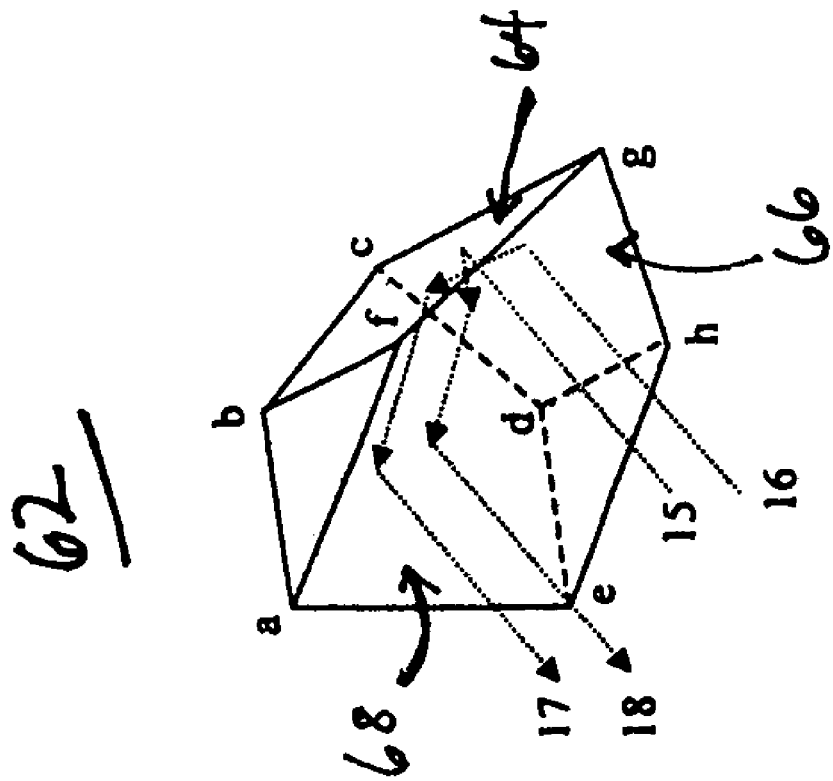
FIG. 3 illustrates a corner cube reflector used in a third preferred embodiment of the optical switch in accordance with the present invention.
Figure 3:
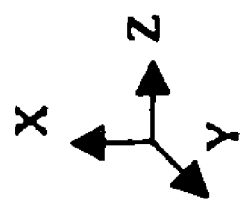
Figure 4D:
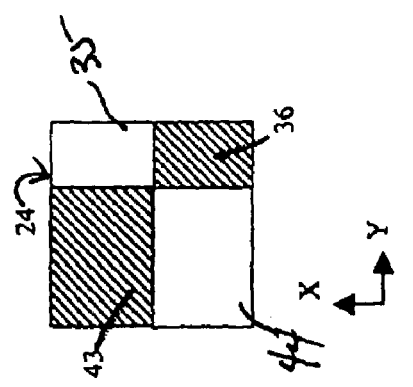
FIGS. 4a-4d illustrate a fourth preferred embodiment of the optical switch in accordance with the present invention.
Figure 4C:
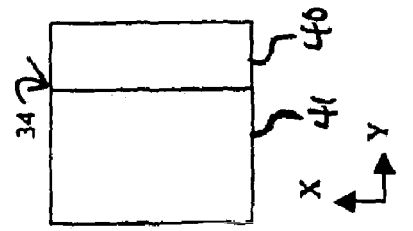
Figure 4A:
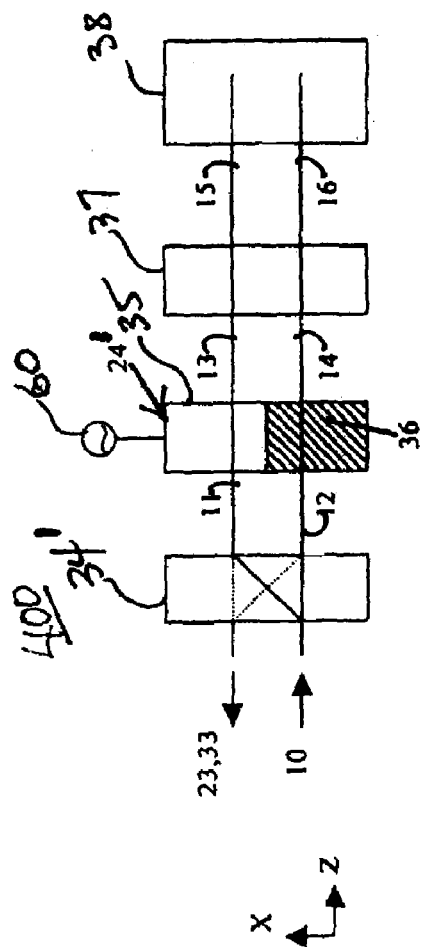
Figure 4B:
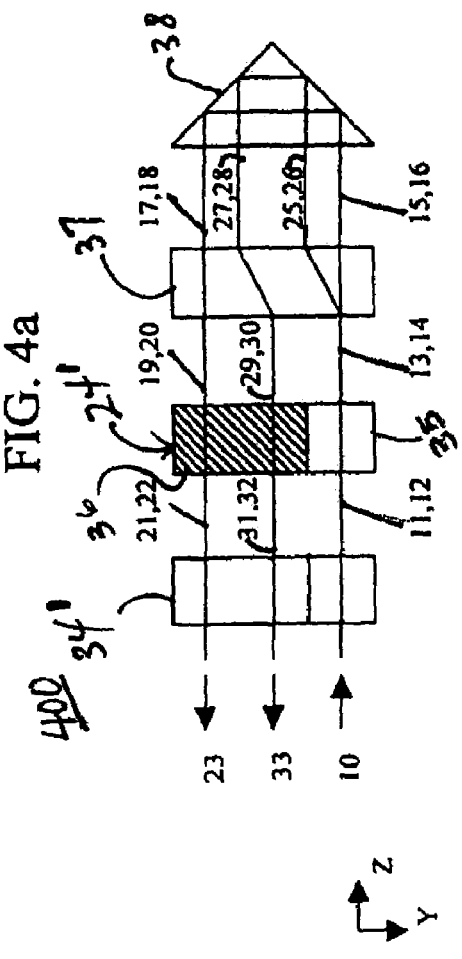

The present invention provides an improved optical switch. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The optical switch in accordance with the present invention utilizes one polarization modulator, with beam components traversing it twice. Because of the twice traverse, the extinction ratio of the switch is doubled without the addition of another polarization modulator, thus avoiding the costs of additional optical components. With no additional components, the switch is more compact than conventional switches with the same extinction ratio. Fewer components also result in more thermal and long-term stability and less crosstalk.

To more particularly describe the features of the present invention, please refer to FIGS. 1a through 6b in conjunction with the discussion below.

FIGS. 1a-1b illustrate a first preferred embodiment of an optical switch in accordance with the present invention. The optical switch 100 comprises a first birefringent polarization beam displacer 34 and a polarization modular 24 optically coupled to the first birefringent polarization beam displacer 34. the polarization modulator 24 comprises a first pixel 35 and a second pixel 36. The optical switch 100 further comprises a second birefringent polarization beam displacer 37 optically coupled to the polarization modular 24 at a side opposite to the first birefringent polarization beam displacer 34, and a right-angle prism 38 optically coupled to the second birefringent polarization beam displacer 37 at a side opposite to the polarization modular 24.

In the first preferred embodiment, the polarization modulator 24 comprises a twisted-nematic liquid crystal device. However, other types of devices may also be used. For example, a magneto-optical or ferroelectrical liquid crystal device can also be used. The first and/or second displacers 34, 37 each comprise a planar parallel plate made of uni-axial crystal materials with its optic axis inclined in the plane defined by the surface normal and the direction of beam displacement. In the first preferred embodiment, the optic axes of the first and second displacers 34 and 37 lie in the y-z plane.

A collimated input beam 10 from an input port (not shown) enters the switch 100 and traverses its components twice, once in a forward direction and once in a return direction. The polarization modulator 24 can rotate the polarization of an incident beam by either 0 or 90 degrees depending on an electrical control signal 60. It has two distinct states. In the first state, the second pixel 36 rotates the polarization by 90 degrees, and the first pixel 35 does not rotate the polarization. In the second state, the first pixel 35 rotates the polarization by 90 degrees, and the second pixel 36 does not rotate the polarization.

In the forward direction with the polarization modulator 24 in the first state, the first displacer 34 spatially separates the beam 10 into two orthogonally polarized beam components 11 and 12. The beam component 11 is polarized along the x-direction, while the beam component 12 is polarized along the y-direction. The beam components 11 and 12 are arranged so that they pass through the first and second pixels 35 and 36 of the polarization modulator 24, respectively.

The y-polarized beam component 12 is rotated by 90 degrees when it passes through the second pixel 36, resulting in a beam component 14 polarized along the x-direction. The beam component 11 passes through the first pixel 35, which does not rotate its polarization, resulting in a beam component 13 also polarized along the x-direction. The beam components 13 and 14 then pass through the second displacer 37. Since the optic axis of the second displacer 37 lies in the y-z plane, beam components 13 and 14 pass through without displacement, resulting in beam components 15 and 16, respectively. Beam components 15 and 16 are then reflected by the right-angle prism 38, emerging as beam components 17 and 18, respectively, traveling in a return direction.

In the return direction with the polarization modulator 24 in the first state, beam components 17 and 18 pass through the second displacer 37 without displacement because they are both polarized in the x-direction, which is perpendicular to the optic axis of the second displacer 37. Beam components 17 and 18 emerge from the second displacer 37 as beam components 19 and 20, respectively, both polarized in the x-direction. Beam component 19 then passes through the second pixel 36, and its polarization is rotated by 90 degrees, becoming the y-polarized beam component 22. Beam component 20 then passes through the first pixel 35, and its polarization is not rotated, resulting in the x-polarized beam component 21. Beam components 21 and 22 pass through the first displacer 34, which recombines them. An output beam 23 emerges from the first displacer 34, which can then be optically coupled into a first output port (not shown).

In the forward direction with the polarization modulator 24 in the second state, the first displacer 34 spatially separated the beam 10 into two orthogonally polarized beam components 11 and 12. The beam component 11 is polarized along the x-direction, while the beam component 12 is polarized along the y-direction. The beam components 11 and 12 are arranged so that they pass through the first and second pixels 35 and 36 of the polarization modulator 24, respectively.

The x-polarized beam component 11 is rotated by 90 degrees when it passes through the first pixel 35, resulting in a beam component 13 polarized along the y-direction. The beam component 12 traverses the second pixel 36, which does not rotate its polarization, resulting in a beam component 14 also polarized along the y-direction. The beam components 13 and 14 then pass through the second displacer 37. Since the optic axis of the second displacer 37 lies in the y-z plane, beam components 13 and 14 pass through with a displacement in the y-direction, resulting in beam components 25 and 26, respectively. Beam components 25 and 26 are then reflected by the right-angle prism 38, emerging as beam components 27 and 28, respectively, traveling in the return direction.

In the return direction with the polarization modulator 24 in the second state, beam components 27 and 28 pass the second displacer 37 with another displacement in the y-direction, resulting in beam components 29 and 30, respectively, both polarized in the y-direction. Beam component 29 then passes through the first pixel 35, and its polarization is rotated by 90 degrees, becoming the x-polarized beam component 31. Beam component 30 then traverses through the second pixel 36, and its polarization is not rotated, resulting in a y-polarized beam component 32. Beam components 31 and 32 pass through the first displacer 34, which recombines them. An output beam 33 emerges from the first displacer 34, which can then be optically coupled into a second output port (not shown).

Thus, when the polarization modulator 24 is in the first state, the input beam 10 emerges from the switch 100 as output beam 23. When the polarization modulator 24 is in the second state, the input beam 10 emerges from the switch 10 as output beam 33. The output beams 23 and 33 emerge from the switch 100 at different locations along the y-direction.

The first preferred embodiment of the optical switch 100 utilizes one polarization modulator 24, with the beam components traversing it twice, once in the forward direction and once in the return direction. Because of the twice traverse, the extinction ratio of the switch 100 is doubled without the addition of another polarization modulator. Thus, the extinction ratio of the switch 100 is increased without the costs of additional optical components. With no additional components, the switch 100 is more compact than conventional switches with the same extinction ratio. Fewer components also result in more thermal and long-term stability and less crosstalk. Further more, the two pixels of the polarization modulator 24 allow for easier optical alignment and lower manufacturing costs.

Also because of the twice traverse, the second displacer 37 can be half of the thickness of conventional switches while still achieving the same spatial beam displacement. In addition, only two polarization beam displacers are required as opposed to three. The thickness reduction and the need for fewer polarization beam displacers lead to lower cost and more compactness. Furthermore, the input and output ports reside on the same side or the same level of the switch 100, which makes the switch 100 easier to integrate into a system.

FIGS. 2*a* and 2*b* illustrate a second preferred embodiment of the optical switch in accordance with the present invention. The optical switch 200 comprises the same optical components as the optical switch 100, illustrated in FIGS. 1*a*-1*b*, with the addition of a glass compensating plate 39 optically coupled between the first displacer 34 and the polarization modulator 24 and inserted into part of the optical path. The glass plate 39 compensates for the polarization mode dispersion (PMD) resulting from a pass through the first displacer 34 in the forward direction. PMD is measure of differential group delay between two orthogonal polarizations. Input and output beams propagate through the first displacer 34, and because of birefringence, the x polarization propagates at a different speed as compared with the y polarization. The thickness of the glass plate 39 is chose according to the following equation:

$$d = \frac{|n_y - n_x|D}{(n_g - 1)} \quad \text{(Eq.1)}$$

where D is the thickness of the first displacer 34, $n_g$ is the index of refraction of the glass plate 39, and $n_x$ and $n_y$ are the indices of the x and y polarizations, respectively. As illustrated in FIG. 2a, only the x-polarized beam components 11, 21, 31 pass through the glass plate 39. The amount of optical path added to the beam components 11, 21, 31 by the glass plate 39 cancels the PMD from the first displacer 34. It should be noted that if $n_y<n_x$, the glass plate 39 should be added to the path of y-polarized beams.

FIG. 3 illustrates a corner cube reflector used in a third preferred embodiment of the optical switch in accordance with the present invention. In the third preferred embodiment, the optical switch comprises the same components as the optical switch 100 (FIGS. 1a-1b) or the optical switch 200 (FIGS. 2a-2b), except the right-angle prism 38 is replaced by a corner cube reflector 62. The corner cube reflector 62 has three reflecting surface 64, 66, and 68, defined by vertexes b-c-g-f, d-c-g-h, and a-b-c-d-e, respectively. The beam components 15 and 16 are first reflected from surface 66, then by surface 64, then by surface 68. The reflecting surfaces 64 and 66 each preserves the polarization of the beam components 15 and 16. This can be achieved by coating the surfaces 64 and 66 with a metal reflecting layer or multi-layer coatings. These coatings are designed to correct phase differences between the two orthogonal polarization components of the reflected beam. With the coatings, polarization states will be preserved upon reflection.

After being reflected from the three reflecting surfaces 64, 66, and 68, "upper" beam component 15 emerges from the corner cube reflector 62 as the "lower" beam component 18. Similarly, the "lower" beam component 16 emerges from the corner cube reflector 62 as the "upper" beam component 17. In essence, beam components 15 and 16 switch positions after traversing the corner cube reflector 62. As beam components 17 and 18 eventually enter the first displacer 34 in the return direction as beam components 21 and 22, respectively, the resulting PMD cancels the PMD generated when the input beam 10 entered the first displacer 34. In this manner, the total PMD of the switch is eliminated.

FIGS. 4a-4d illustrate a fourth preferred embodiment of the optical switch in accordance with the present invention. The optical switch 400 comprises the same components as the optical switch 100, except the polarization modulator 24' comprises four pixels 35, 36, 43, and 44 instead of two (see FIG. 4d), and the first displacer 34' is divided into two pieces 40 and 41 (see FIG. 4c). The diagonal pixels 35 and 44 of the polarization modulator 24' are coupled and switched simultaneously. Similarly, pixels 43 and 36 of the polarization modulator 24' are coupled and switched simultaneously. The two pieces 40 and 41 of the first displacer 34' are optical identical, except that piece 41 is rotated by 180 degrees along the x-axis so that the two pieces 40 and 41 have opposite beam displacement along the x-axis.

When the switch 400 is in the first state, the optical path of the input beam 10 is the same as for the optical switch 100 until beam components 19 and 20 enter the polarization modulator 24'. In the first state, the pixel 43 of the polarization modulator 24' rotates the polarization of beam component 19 by 90 degrees, resulting in beam component 21 polarized in the y-direction. Pixel 44 of the polarization modulator 24' does not rotate the polarization of beam 20, resulting in a beam component 22 polarized in the x-direction. Beam components 21 and 22 are recombined by the first displacer 34', resulting in the output beam 23. Thus, the beam component 11 of the input beam 10 is displaced by the first displacer 34' when traversing in the forward direction, while the corresponding beam component 21 of the output beam 23 passes straight through the first displacer 34' in the return direction. Similarly, the beam component 12 of the input beam 10 passes straight through the first displacer 34' in the forward direction, while the corresponding beam component 22 of the output beam 23 is displaced by the first displacer 34' when traversing in the return direction. Thus, the two polarization beam components of the output beam 23 have the same optical length, eliminating PMD.

When the switch 400 is in the second state, the optical path of the input beam 10 is the same as for the optical switch 100 until beam components 29 and 30 enter the polarization modulator 24'. In the second state, the pixel 43 of the polarization modulator 24' rotates the polarization of beam component 30 by 90 degrees, resulting in beam component 32 polarized in the x-direction. Pixel 44 of the polarization modulator 24' does not rotate the polarization of beam 29, resulting in a beam component 31 polarized in the y-direction. Beam components 31 and 32 are recombined by the first displacer 34', resulting in the output beam 33. Thus, the beam component 11 of the input beam 10 is displaced by the first displacer 34' when traversing in the forward direction, while the corresponding beam component 31 of the output beam 33 passes straight through the first displacer 34' in the return direction. Similarly, the beam component 12 of the input beam 10 passes straight through the first displacer 34' in the forward direction, while the corresponding beam component 32 of the output beam 33 is displaced by the first displacer 34' when traversing in the return direction. Thus, the two polarization beam components of the output beam 33 have the same optical length, eliminating PMD.

FIGS. 5a-5c illustrate a fifth preferred embodiment of the optical switch in accordance with the present invention. The optical switch 500 comprises the same components as the optical switch 400, except the four pixels 35, 36, 53, and 54 of the polarization modulator 24" reside within the same x-z plane. The right-angle prism 38 folds the optical path within the x-z plane. The pixels 35 and 54 of the polarization modulator 24" are coupled and are switched simultaneously. Similarly, the pixels 36 and 53 are coupled and are switched simultaneously. In a similar manner as with the optical switch 400, PMD from a pass through the first displacer 34 in the forward direction is canceled when the beam components pass through the first displacer 34 in the return direction. In the fifth preferred embodiment, the thickness of the second displacer 37' is approximately twice that of the second displacer 37 in optical switch 400. Because the pixels 35, 36, 53, and 54 of the polarization modulator 24" lies in the same x-z plane, the switch 500 can be thinner than the switch 100.

FIGS. 6a-6b illustrate a sixth preferred embodiment of the optical switch in accordance with the present invention. The optical switch 600 has the same components as the optical switch 100, except the polarization modulator 24''' has a single pixel, and a half-wave plate 49 is optically coupled between the first displacer 34 and the polarization modulator 24'''. The combination of the single pixel polarization modulator 24''' and the half-wave plate 49 serves the same functionality as the two-pixel polarization modulator 24 of the optical switch 100. The half-wave plate 49 is configured such that beam components 11, 21, and 31 traverse the half-wave plate 49, while beam components 12, 22, and 32 do not. In the sixth preferred embodiment, the half-wave plate 49 has its "fast axis", i.e., the polarization direction in which a beam travels faster, aligned 45 degrees relative to the principle axis of the polarization modulator 600.

For clarity of illustration, the optical components of the optical switches 100, 200, 300, 400, 500, and 600 are illustrated above as being separated. However, these components may be packed together to form a rugged switch. In addition, the preferred embodiments above can each be used as a variable optical attenuator (VOA) or variable power splitter, if the polarization modulator is controlled to partially rotate the polarization state of the input beam 10.

An improved optical switch has been disclosed. The optical switch utilizes one polarization modulator, with the beam components traversing it twice. Because of the twice traverse, the extinction ratio of the switch is doubled without the addition of another polarization modulator, thus avoiding the costs of additional optical components. With no additional components, the switch is more compact than conventional switches with the same extinction ratio. Fewer components also result in more thermal and long-term stability and less crosstalk.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical switch having an input port and first and second output ports, comprising:
   a first birefringent polarization beam displacer;
   a polarization modulator optically coupled to the first birefringent polarization beam displacer, the polarization modulator controllable between a first state and a second state;
   a second birefringent polarization beam displacer optically coupled to the polarization modulator at a side opposite to the first birefringent polarization beam displacer;
   a reflector optically coupled to the second birefringent polarization beam displacer at a side opposite to the polarization modulator, wherein the reflector has a first reflecting surface, a second reflecting surface and a third reflecting surface; and
   a glass compensating plate optically coupled between only a portion of the first birefringent polarization beam displacer and only a portion of the polarization modulator,
   wherein an optical beam traverses the first birefringent polarization beam displacer, the polarization modulator, and the second birefringent polarization beam displacer in a forward direction to the reflector,
   wherein the optical beam is reflected from the first reflecting surface, then the second reflecting surface and then the third reflecting surface of the reflector into a return direction,
   wherein the reflected optical beam traverses the second birefringent polarization beam displacer, the polarization modulator, and the first birefringent polarization beam displacer in a return direction and emerges from the first output port when the polarization modulator is controlled to be in the first state and from the second output port when the polarization modulator is controlled to be in the second state, and
   wherein the input port and the first and second output ports are on the same side of the optical switch.

2. The switch of claim 1, wherein when the optical beam traverses the first birefringent polarization beam displacer in the forward direction, the first birefringent polarization beam displacer spatially separates the optical beam into a first beam component with a first polarization and a second beam component with a second polarization, wherein the first polarization is orthogonal to the second polarization.

3. The switch of claim 2, wherein the polarization modulator comprises a first pixel and a second pixel, wherein the second pixel rotates the second polarization into the first polarization when the switch is in a first state, wherein the first pixel rotates the first polarization into the second polarization when the switch is in a second state.

4. The switch of claim 3, wherein the first beam component traverses the first pixel and the second beam component traverses the second pixel.

5. The switch of claim 2, wherein the second birefringent polarization beam displacer displaces a traversing beam component with the first polarization and does not displace a traversing beam component with the second polarization.

6. The switch of claim 2, wherein the first beam component traverses the glass compensating plate in both the forward and the return directions.

7. The switch of claim 1, wherein the first reflecting surface and the second reflecting surface of the reflector includes a coating that is used to preserve the polarization of the optical beam.

8. The switch of claim 1, wherein the reflector comprises a corner cube reflector.

9. The switch of claim 1, wherein the polarization modulator comprises a single pixel.

10. The switch of claim 1, wherein the first birefringent polarization beam displacer combines a first and a second beam component traversing in the return direction into an output beam.

11. The switch of claim 1, wherein the polarization modulator comprises a twisted-nematic liquid crystal device.

12. The switch of claim 1, wherein the first birefringent polarization beam displacer comprises a planar parallel plate made of uni-axial crystal material.

13. The switch of claim 1, wherein the optical beam traverses the glass compensating plate in the forward direction.

14. The switch of claim 13, wherein the reflected optical beam traverses the glass compensating plate in the return direction.

15. An optical switch having an input port and first and second output ports, comprising:
   a first birefringent polarization beam displacer having a first part and a second part;
   a polarization modulator optically coupled to the first birefringent polarization beam displacer, the polarization modulator having a first pixel and a second pixel, each pixel rotates the polarization of an incident beam into a first polarization when the polarization modulator is in a first state and into a second polarization when the polarization modulator is in a second state, wherein the polarization modular has a first portion and a second portion;
   a glass compensating plate positioned between the first birefringent polarization beam displacer and the polarization modulator such that the first part of the first birefringent polarization beam displacer and the first portion of the polarization modulator are optically coupled via the glass compensating plate and the second part of the first birefringent polarization beam displacer and the second portion of the polarization modulator are not optically coupled via the glass compensating plate;

a second birefringent polarization beam displacer optically coupled to the polarization modulator at a side opposite to the first birefringent polarization beam displacer; and a reflector optically coupled to the second birefringent polarization beam displacer at a side opposite to the polarization modulator, wherein the input optical beam traverses the first birefringent polarization beam displacer, the glass compensating plate, the polarization modulator, and the second birefringent polarization beam displacer in a forward direction to the reflector, wherein the reflector reflects the optical beam into a return direction, wherein the reflected optical beam traverses the second birefringent polarization beam displacer, the polarization modulator, the glass compensating plate, and the first birefringent polarization beam displacer in a return direction and emerges from the first output port when the polarization modulator is in the first state and from the second output port when the polarization modulator is in the second state, and wherein the input port and the first and second output ports are on the same side of the optical switch.

16. The switch of claim 15, wherein when the optical beam traverses the first birefringent polarization beam displacer in the forward direction, the first birefringent polarization beam displacer spatially separates the optical beam into a first beam component with a first polarization and a second beam component with a second polarization, wherein the first polarization is orthogonal to the second polarization.

17. The switch of claim 16, wherein the first beam component traverses the glass compensating plate in both the forward and the return directions.

18. The switch of claim 15, wherein the first birefringent polarization beam displacer combines a first and a second beam component traversing in the return direction into an output beam.

19. The switch of claim 15, wherein the reflector comprises a first reflecting surface and a second reflecting surface that includes a coating that is used to preserve the polarization of the optical beam.

20. The switch of claim 15, wherein the reflector comprises a corner cube reflector.

21. The switch of claim 15, wherein the polarization modulator comprises a twisted-nematic liquid crystal device.

22. The switch of claim 15, wherein the first birefringent polarization beam displacer comprises a planar parallel plate made of uni-axial crystal material.

23. A method for switching an optical signal, comprising:
traversing the optical signal in a forward direction;
spatially separating the optical signal into a first beam component with a first polarization and a second beam component with a second polarization utilizing a first birefringent polarization beam displacer, wherein the first polarization is orthogonal to the second polarization;
compensating for a polarization mode dispersion resulting from a pass through the first birefringent polarization beam displacer by using a glass compensating plate, wherein the glass compensating plate is coupled between only a portion of the first birefringent polarization beam displacer and only a portion of a polarization modulator;
controlling the polarization modulator to be in a desired one of a first state and a second state and passing the first and second beam components through the polarization modulator in the forward direction, wherein the polarization modulator rotates the second polarization into the first polarization when the polarization modulator is in the first state, wherein the polarization modulator rotates the first polarization into the second polarization when the polarization modulator is in the second state;
passing the first and the second beam component through a second birefringent polarization beam displacer in the forward direction, wherein the first or the second beam component is displaced if the first or the second beam component has the first polarization;
reflecting the first and the second beam components into a return direction;
passing the reflected first or second beam component through the second birefringent polarization beam displacer in the return direction, wherein the reflected first or the second beam component is displaced if the first or the second beam component has the first polarization;
passing the reflected first and second beam components through the polarization modulator in the return direction, wherein the polarization modulator rotates the second polarization into the first polarization when the polarization modulator is in a first state, wherein the polarization modulator rotates the first polarization into the second polarization when the polarization modulator is in a second state; and
combining the reflected first and second beam components by the first birefringent polarization beam displacer into an output beam.

* * * * *

UNITED STATES PATENT AND TRADEMARK OFFICE
CERTIFICATE OF CORRECTION

| | | |
|---|---|---|
| PATENT NO. | : 7,486,443 B1 | Page 1 of 1 |
| APPLICATION NO. | : 10/224748 | |
| DATED | : February 3, 2009 | |
| INVENTOR(S) | : Li et al. | |

It is certified that error appears in the above-identified patent and that said Letters Patent is hereby corrected as shown below:

On the Title Page,

In the Related U. S. Application Data Item (60):

Please insert, Provisional application No. 60/209,733, filed on Jun. 5, 2000, provisional application No. 60/211,347, filed on Jun. 13, 2000, provisional application No. 60/232,168, filed on Sept. 11, 2000, --provisional application No. 60/314,354, filed on Aug. 22, 2001--.

Signed and Sealed this

Twenty-fourth Day of March, 2009

JOHN DOLL
*Acting Director of the United States Patent and Trademark Office*